United States Patent [19]
Janu et al.

[11] Patent Number: 6,126,540
[45] Date of Patent: Oct. 3, 2000

[54] STAGED POWER EXHAUST FOR HVAC AIR HANDLING UNITS

[75] Inventors: George J. Janu, Brookfield; James Reisdorfer, Oregon, both of Wis.

[73] Assignee: Johnson Controls Technology Company, Plymouth, Mich.

[21] Appl. No.: 09/361,823

[22] Filed: Jul. 27, 1999

[51] Int. Cl.$^7$ ..................................................... F24F 11/04
[52] U.S. Cl. ........................... 454/229; 165/249; 454/236
[58] Field of Search .................................... 454/229, 236; 165/249

[56] References Cited

U.S. PATENT DOCUMENTS 4,086,781  5/1978  Brody et al. .
4,836,096  6/1989  Avery .
5,976,010  11/1999  Reese et al. .............................. 454/229

*Primary Examiner*—Harold Joyce
*Attorney, Agent, or Firm*—Quarles & Brady LLP; George E. Haas

[57] ABSTRACT

An air handling unit for a heating, ventilating and air conditioning system of a building has a plurality of exhaust fans. The exhaust fans are sequentially activated in response to the amount of air flowing into the air handling unit from outdoors. Thus the amount of air exhausted from the building approximates the amount of air drawn into the building through the air handling unit. This operation maintains the static air pressure within the building to acceptable levels.

21 Claims, 1 Drawing Sheet

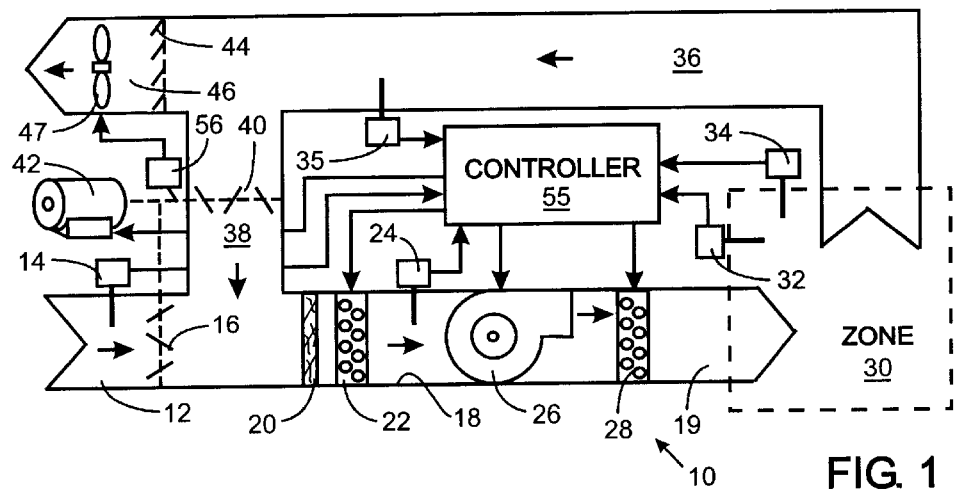
FIG. 1
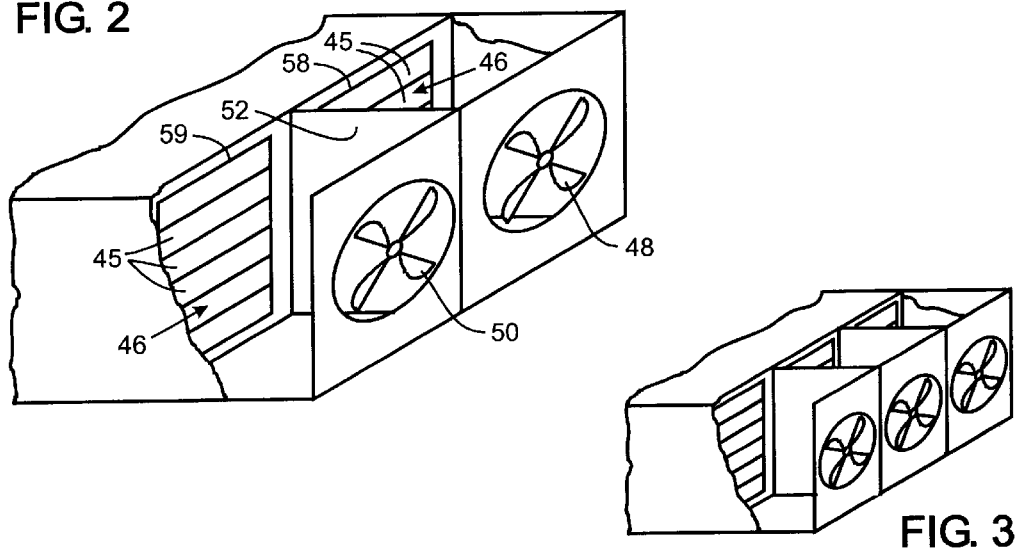
FIG. 2
FIG. 3
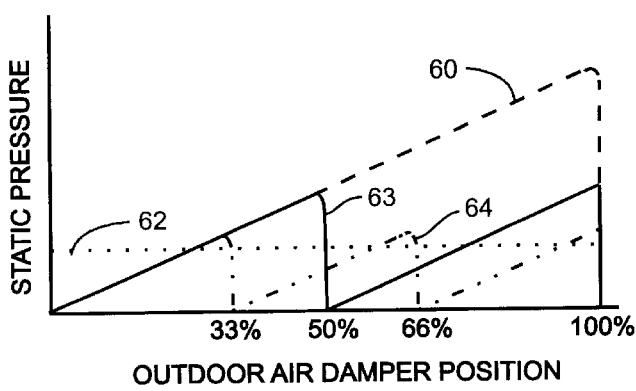
FIG. 4

STAGED POWER EXHAUST FOR HVAC AIR HANDLING UNITS

BACKGROUND OF THE INVENTION

The present invention relates to exhausting air from a heating, ventilating and air conditioning system; and in particular to the exhaust control of an air handling unit.

Heating, ventilating and air conditioning (HVAC) systems are well known for maintaining environmental conditions within buildings. A typical HVAC installation divides the building into zones and regulates environmental parameters (e.g. temperature, humidity, outdoor/recirculated air ratio, etc.) of each zone to predefined control setpoints. An air distribution system connects each of the zones to a separate air handling unit (A.U.) that conditions the air supplied to a particular zone. The air handling unit generally includes elements for introducing outdoor air into the system and for exhausting air from the system. Other elements are provided for heating, cooling, filtering and otherwise conditioning the air for the zone.

The air handling unit has a constant volume supply fan to circulate the air within the zone's air distribution ducts at a desired flow rate. A pair of electrically operated dampers control the amounts of outdoor air and recirculated air that are fed into the zone. Typically these dampers are operated by a common actuator so that as one damper closes the other damper opens, and vice versa. As a consequence of introducing outdoor air into the zone, a varying volume of air is added to the zone. That same volume of air has to be exhausted or the pressure within the zone will increase to unacceptable levels.

Thus a barometric relief damper typically is built into the air handling unit to allow air to flow from the system to the outdoors. The relief damper can be implemented by a series of vertically mounted, hinged metal blades that remain closed due to gravity when air is not flowing through the system. Air flow through the system causes the blades open when a significant difference between the static air pressure in the zone and the outdoor atmospheric pressure exists. The actual pressure differential across the damper may be less than that pressure difference due to flow resistance in the return air ducts. The amount of air relieved by a barometric relief damper is a function of the damper's flow-through area A and the pressure differential $\Delta P$ as given by the expression:

$$\text{FLOW} = k_1 A \sqrt{k_2 \Delta P} \qquad (1)$$

where $k_1$, and $k_2$ are constants. Although a slight positive pressure (e.g. 0.05" w.g.) within the zone is beneficial, too large a pressure differential results in difficulty operating doors and whistling noises due to air escaping the zone.

Outdoor air is drawn into the air handling unit by an internal fan and thus the maximum amount of air that has to be exhausted through the barometric relief damper is equal to the fan's airflow when the outdoor air damper is fully opened. However, the typical barometric relief damper cannot relieve that much air flow unless the pressure differential reaches an unexceptionably high level, in some instances more than ten times an acceptable pressure level within the zone. Thus, in typical air handling units it is impractical to build a barometric relief damper with a flow-through area that is large enough to relieve the maximum air flow without exceeding a 0.05" w.g. static pressure in the zone.

As a solution, some air handling units provide a power exhaust fan on the outside of the barometric relief damper. When the power exhaust fan operates, air is drawn through the barometric relief damper due to an increased pressure differential across that damper, thereby increasing the relief air flow without an increase in the zone static pressure. The resulting air flow depends on the power exhaust fan's flow characteristic, as well as on the barometric relief damper flow characteristic. The typical power exhaust fan is used to boost the relief air flow only at times where the outdoor air inlet damper was opened fully, that is at times when the amount of the outdoor air brought into the space is fairly large. If the relief air flow from the power exhaust fan is too great, the zone static air pressure decreases to a negative level (less than atmospheric pressure) with the undesirable effect that outside air infiltrates the zone. Such infiltration may occur through other building envelope openings.

Current industry practice is to size the exhaust fan to be capable of relieving the air handling unit's maximum outdoor air inflow, as occurs when the outdoor air supply damper is fully open. Thus, the power exhaust fan turns on only when the outdoor air damper is open all the way. Typically, a switch for controlling the exhaust fan is mounted on the outdoor air supply damper and closes when that damper reaches the fully open position. However, this control does not permit the exhaust fan to relieve air when the outdoor air supply damper is less than fully opened. As noted previously, if that exhaust fan is activated at a lower flow of outdoor supply air a negative pressure will be created within the zone.

Some air handling units attempted to cure this problem by utilizing relatively expensive, variable speed/variable flow capacity power exhaust fan systems. Such systems require a variable speed motor controller with a pressure sensor located within the zone to provide closed loop static pressure control of the fan. The power exhaust fan still is sized to exhaust 100% of the outdoor air that is added by the supply damper being fully opened, but the speed of the fan is controlled to maintain an acceptable static pressure level within the zone. However, it is desirable to provide a less expensive and less sophisticated control of the exhaust air flow.

SUMMARY OF THE INVENTION

A general object of the present invention is to provide an exhaust fan assembly for an air handling unit, which provides a plurality of air flow rates through the exhaust damper.

Another object of the present invention is to employ a plurality of exhaust fans which are activated in response to different amounts of outdoor air being supplied to the environmental control system.

An air handling unit includes an outdoor air inlet adapted to receive air from outside the building and a supply air outlet which receives air from the outdoor air inlet. Air from the supply air outlet flows to the building zone being environmentally controlled. A return air inlet is adapted to receive air from the building zone and an exhaust air outlet is connected to the return air inlet. An outdoor air damper is provided to control air flow through the outdoor air inlet, and a recirculated air damper controls air flow from the return air inlet to the supply air outlet.

A plurality of fans are connected to the exhaust air outlet. A control circuit sequentially activates each of the plurality of fans in response different amounts of air flowing through the outdoor air inlet. In the preferred embodiment, the control circuit senses when the outdoor air damper is opened to several different positions and activates different combinations of the fans in response to that position sensing.

By selectively activating the fans in response to the amount of air flowing into the zone from outdoors, the static air pressure within the zone is maintained at acceptable levels. The static air pressure does not rise to a magnitude at which operation of building doors becomes difficult and other objectionable events occur.

BRIEF DESCRIPTION OF THE DRAWINGS

FIG. 1 is a schematic diagram of a rooftop HVAC air handling unit according to the present invention;

FIG. 2 is an isometric depiction of exhaust section of the air handling unit;

FIG. 3 is an isometric depiction of an alternative exhaust section of the air handling unit; and FIG. 4 is a graph depicting the relationship between the supply air opening and static pressure in the zone.

DETAILED DESCRIPTION OF THE INVENTION

With initial reference to FIG. 1, an air handling unit 10 has an outdoor air inlet 12 with an outdoor air temperature and humidity sensor 14 located within the duct. An outdoor air damper 16 is mounted within the outdoor air inlet 12 and is movable to positions between an extreme fully closed and another extreme fully opened to control the amount of air flowing through the outdoor air inlet. The inlet 12 communicates with a supply duct 18, which leads to a supply air outlet 19 through which air flows to an environmental control zone 30 of the building.

The supply duct 18 of the air handling unit contains a conventional filter 20, a cooling coil 22 in which the air flows over tubing containing a chilled fluid. A discharge air temperature sensor 24 is located in the supply duct 18 on the remote side of the cooling coil 22 from filter 20. A supply fan 26 draws air through filter 20 and cooling coil 22 and forces the air through the supply duct 18 toward outlet 19. A heating coil 28 is located within the supply duct at the outlet side of the fan 26. Air from the fan 26 passes through the heating coil 28 which has tubes through which heated water flows when a valve (not shown) is opened.

A thermostat 32 and an indoor air quality sensor 34 are located within the zone to sense environmental parameters. A duct connected to a return air inlet 36 carries air from the zone 30 and a return air temperature and humidity sensor 35 monitors those characteristics of the air in the return air inlet. A recirculation duct 38 provides a path from the return air inlet 36 to the supply duct 18 upstream of the filter 20. A recirculated air damper 40 is mounted within the recirculation duct 38 to control the amount of air from the return duct that flows to the supply duct. Both the recirculated air damper 40 and the outdoor air damper 16 are connected in common to a conventional actuator 42. That coupling comprises a standard shaft and gear arrangement such that as one of the dampers 16 or 40 opens the other damper closes in a proportional amount. Thus, as the outdoor air damper 16 opens a greater amount of air will be drawn in from the outdoor air inlet 12 to the zone supply duct 18 and a lesser amount of air will be recirculated through the recirculation duct 38 from the return duct 36. The opposite air flow relationship occurs as the recirculated air damper opens and the outdoor air damper 16 closes.

The damper actuator 42, as well as other components, are controlled by a microcomputer based controller 55, of a type commonly found in air handling units. The controller 55 executes a software program which responds to signals from air sensors 14, 24, 32, 34, and 35 by operating the supply fan 26, the valves for the cooling and heating coils 22 and 28, and the damper actuator 42.

With reference to FIG. 1, an exhaust air outlet 44 is connected to the return air inlet 36 and has a barometric relief damper 46 extending there across. The barometric relief damper 46 comprises a series of vertically positioned, hinged sheet metal blades which remain closed due to gravity when there is no air flowing through the system. When the supply fan is running and only a small amount of outdoor air is being introduced into the system, reverse pressure differential also maintains the barometric relief damper 46 closed.

The exhaust air outlet 44 contains an electrically driven exhaust fan 47 which has a capacity approximately equal to 50% of the maximum air flow through outdoor air inlet 12. The electric motor of the exhaust fan 47 is controlled by a sensor assembly 56 which is activated by the actuator linkage for the outdoor air damper 16 and the return air damper 40 to detect the position of the outdoor air damper, as will be described. When the exhaust fan 47 is energized, air is drawn from the outlet channel creating a pressure differential across the barometric relief damper 46. That pressure differential causes the blades of that damper 46 to open.

The graph of FIG. 4 shows the relationship of the static air pressure within building zone 30 to the position of the outdoor air damper 16. In prior systems which utilized a single exhaust fan with a capacity equal to the maximum air flow through outdoor air inlet, the static air pressure increased as shown by dashed line 60 until the fan started. The exhaust fan was not activated until the outdoor air damper reached the fully open position. Thus the positive static pressure in the zone greatly exceeded the desired pressure level indicated by dotted horizontal line 62.

In the present invention, the single exhaust fan is activated when the outdoor air flow reaches about one-half the maximum flow through the inlet 12. Specifically when the outdoor air damper 16 opens to substantially 50% of its extreme open position. In this system, a switch within the sensor assembly 56 operates to turn-on the exhaust fan 47. As a result, the exhaust fan 47 increases the flow of air through the exhaust outlet 44 causing the static pressure in building zone 30 to drop precipitously as indicated by the solid line 63 in FIG. 4. This results in the static air pressure within zone 30 dropping to substantially zero. The static pressure within zone 30 may not actually decrease to zero due to flow restrictions in the return air inlet 36. Thereafter as the outdoor air damper 16 continues to open, drawing more air into the zone 30, the static pressure continues to rise until the damper is fully open. However with this exhaust control methodology the maximum static air pressure is significantly less than that in previous single fan systems as indicated by the peaks of lines 60 and 63.

FIG. 2 illustrates an alternative embodiment in which the exhaust air outlet 44 on the remote side of barometric relief damper 46 from the return air inlet 36 is subdivided into separate channels by a barrier wall 52. The barometric relief damper 46 has a separate section 58 and 59 associated with each channel. An exhaust fan 48 or 50 is located within each channel. The two exhaust fans 48 and 50 are driven by separate electric motors controlled by the sensor assembly 56 which is activated by the actuator linkage for the outdoor air damper 16. When one of the exhaust fans 48 or 50 is energized, air is drawn from the associated outlet channel, thereby creating a pressure differential across the respective section 58 or 59 of the barometric relief damper 46. That pressure differential causes the blades of the associated damper section to open.

The exhaust fans 48 and 49 of the present air handling unit 10 are sized to each draw approximately 33% of the maximum amount of air that can flow through the outdoor air inlet 12. In this system, a switch within the sensor assembly 56 operates to energize the first exhaust fan 48, when the outdoor air damper 16 opens to substantially one-third of its extreme open position. Activation of the first exhaust fan 48 creates a sizeable pressure differential across section 58 of the barometric relief damper 46 (see FIG. 2), thereby opening that damper section so that air will be drawn from the return air inlet 36 through the exhaust air outlet 44. As shown by line 64 in FIG. 4, this results in the static air pressure within zone 30 dropping to substantially zero.

The barrier wall 52, shown in FIG. 2, prevents air from being drawn in through the inactive second exhaust fan 50 by the negative pressure produced between the active exhaust fan 48 and section 58 of the barometric relief damper 46. Thus, the activated exhaust fan 48 will draw air only from the return air inlet 36.

As the outdoor air damper 16 continues to open allowing more outdoor air into the zone and the return air damper 40 continues to close proportionally, the static pressure within zone 30 increases again. When the outdoor air damper 16 reaches substantially 66% of the extreme open position, another switch within sensor assembly 56 closes due to mechanical coupling with the outdoor air damper. This second switch closure activates the second exhaust fan 50 which draws air through the second section 59 of the barometric relief damper 46. The two exhaust fans 48 and 50 have a combined flow equal between about 60–80 percent of the maximum flow through the outdoor air inlet damper 16. Thereafter, as the outdoor air damper 16 continues to open drawing more air into the building zone 30, the zone static air pressure continues to rise until the damper is fully open. However, with this dual exhaust fan arrangement, the static pressure within the zone 30 does not rise to as great a peak level as occurred previously in single exhaust fan systems, as indicated by the peaks of line 64 as compared to line 63 or line 60.

The maximum static pressure which can occur within zone 30 can be reduced further by utilizing a third exhaust fan in outlet 44, as depicted in FIG. 3. In this case, the barometric relief damper 46 would be divided into three segments and the exhaust air outlet 44 into three separate channels separated by barrier walls. Three exhaust fans then would be provided for the three barometric relief damper sections. In this embodiment, each exhaust fan is sized to handle substantially one-quarter of the maximum flow of supply air through the outdoor air damper 16. The first exhaust fan is activated by sensor assembly 56 when the outdoor air damper 16 opens to about 25% of the fully opened position, and the second exhaust fan turns on when the outdoor air damper opens to approximately 50% fully open. When the damper for outdoor air opens to 75% of the extreme open position, the third exhaust fan is activated by sensor assembly 56. It should be understood that other numbers of exhaust fans may be provided in the air handling unit according to the present invention.

Alternatively, two smaller power exhaust fans working in parallel could be employed, each being sized to relieve approximately 33% of the maximum air flow. These multiple exhaust fans allow the power exhaust to be applied in several flow capacity stages. For example, one of the exhaust fans can be turned on when the outdoor air damper 16 is about 33% open and the second exhaust fan activates when the outdoor air damper is substantially 66% open.

As another alternative, a pair of two-speed exhaust fans can be used with both being turned on at a low speed which is about half of their flow capacity when the outdoor air damper is about one-third open. When the air damper reaches 66% of its fully opened position, the two exhaust fans are switched to their high speed at which their full flow capacity occurs. It should be noted that the damper openings at which the various exhaust fans are turned on are only approximate. The actual opening settings are determined by the flow characteristic of the outdoor air damper 16 and set so that the exhaust fans are set to be activated at points where the outdoor air flow actually matches the exhaust fan flow capacity.

The concept of using a power exhaust arrangement with multiple exhaust fans provides the added advantage over conventional industry practice of using a single exhaust fan sized to 100% of capacity. The present exhaust fan arrangement can be designed using lower flow capacity axial fans, which allows for more compact and lighter weight packaging.

What is claimed is:
1. An air handling unit for a environmental control system for a zone of a building, the air handling unit comprising:
   an outdoor air inlet adapted to receive air from outside the building;
   a supply air outlet connected the outdoor air inlet to receive air therefrom and being adapted to supply air to the zone of the building;
   return air inlet adapted to receive air from the zone of the building;
   an exhaust air outlet connected to the return air inlet;
   an outdoor air damper coupled to the outdoor air inlet and controlling air flow through the outdoor air inlet;
   a recirculated air damper connected between the return air inlet and the supply air outlet for controlling air flow there between;
   a N fans connected to the exhaust air outlet, where N is a positive integer; and
   a control circuit which sequentially activates each of the N fans in response to an amount of air flowing through the outdoor air inlet, where each fan is designated by a different integer X from 1 to N, wherein a given fan X is turned on when the air flow is substantially X/N+1 of the maximum air flow through the outdoor air damper.

2. The air handling unit as recited in claim 1 further comprising a barometric relief damper positioned between the N fans and the return air inlet.

3. The air handling unit as recited in claim 1 wherein:
   the outdoor air damper is movable into a plurality of positions between an extreme closed position and an extreme open position; and
   the control circuit has a sensor assembly connected to the N fans, wherein the sensor assembly selectively activates each fan in response to positions of the outdoor air damper.

4. The air handling unit as recited in claim 1 further comprising:
   a passage connecting the outdoor air damper and the recirculated air damper to the supply air outlet;
   a supply fan located in the passage to force air to the supply air outlet;
   an air conditioning element located in the passage, wherein the air conditioning element is selected from the group consisting of a filter, a cooling element, and a heating element.

5. The air handling unit as recited in claim 1 wherein each one of the N fans has a flow capacity substantially equal to a maximum air flow through the outdoor air inlet divided by N+1.

6. An air handling unit for a environmental control system for a zone of a building, the air handling unit comprising:

an outdoor air inlet adapted to receive air from outside the building;

a supply air outlet connected the outdoor air inlet to receive air therefrom and being adapted to supply air to the zone of the building;

return air inlet adapted to receive air from the zone of the building;

an exhaust air outlet connected to the return air inlet;

an outdoor air damper coupled to the outdoor air inlet and controlling air flow through the outdoor air inlet;

a recirculated air damper connected between the return air inlet and the supply air outlet for controlling air flow there between;

a plurality of N fans connected to the exhaust air outlet, where N is a plural integer; and a control circuit which sequentially activates each of the plurality of N fans in response to different amounts of air flowing through the outdoor air inlet.

7. The air handling unit as recited in claim 6 further comprising a relief damper coupled to the exhaust air outlet.

8. The air handling unit as recited in claim 7 wherein the relief damper comprises a plurality of blades pivotally mounted in the exhaust air outlet.

9. The air handling unit as recited in claim 6 further comprising a barometric relief damper positioned between the plurality of N fans and the return air inlet.

10. The air handling unit as recited in claim 6 wherein the control circuit comprises a sensor assembly connected to the plurality of N fans, wherein the sensor assembly activates the fans in response to an amount that the outdoor air damper is open.

11. The air handling unit as recited in claim 6 wherein:

the outdoor air damper is movable into a plurality of positions between an extreme closed position and an extreme open position; and the control circuit comprises a sensor assembly connected to the plurality of N fans, wherein the sensor assembly selectively activates each fan in response to positions of the outdoor air damper.

12. The air handling unit as recited in claim 6 wherein there are two fans, and one fan is turned on when the outdoor air damper opens to substantially one-third of an extreme open position, and the other fan is turned on when the outdoor air damper opens to substantially two-thirds the extreme open position.

13. The air handling unit as recited in claim 6 wherein N equals three thereby the plurality of N fans comprises a first fan designated number 1, a second fan designated number 2, and a third fan designated number 3; and the first fan is turned on when the outdoor air damper opens to substantially one-quarter an extreme open position, the second fan is turned on when the outdoor air damper opens to substantially two-quarters of the extreme open position, and the third fan is turned on when the outdoor air damper opens substantially three-quarters of the extreme open position.

14. The air handling unit as recited in claim 6 wherein each of the plurality of N fans is designated by a number X where X is an integer between 1 and N inclusive and is unique for each of the fans; and any given one of the plurality of N fans is turned on when the outdoor air damper opens to substantially a fraction X/N+1 of an extreme open position, where X designates the given one of the plurality of N fans.

15. The air handling unit as recited in claim 6 further comprising a passage connecting the outdoor air damper and the recirculated air damper to the supply air outlet; and a fan located in the passage to force air to the supply air outlet.

16. The air handling unit as recited in claim 15 further comprising an air conditioning element located in the passage, wherein the air conditioning element is selected from the group consisting of a filter, a cooling element, and a heating element.

17. An air handling unit for a environmental control system for a zone of a building, the air handling unit comprising:

an outdoor air inlet adapted to receive air from outside the building;

a supply air outlet adapted to supply air to the zone of the building;

a supply passage connecting the outdoor air inlet to the supply air outlet;

return air inlet adapted to receive air from the zone of the building;

an exhaust air outlet;

a return passage connecting the return air inlet to the exhaust air outlet;

a recirculation passage connecting the return passage to the supply passage;

an outdoor air damper controlling air flow through the outdoor air inlet by opening and closing;

a recirculated air damper controlling air flow through the recirculation passage by opening and closing;

a plurality of N fans connected to the exhaust air outlet, where N is a plural integer; and a sensor assembly connected to the plurality of N fans, wherein the sensor assembly activates the fans in response different amounts of air flowing through the outdoor air inlet.

18. The air handling unit recited in claim 17 wherein sensor assembly responds to an amount that the outdoor air damper is open.

19. The air handling unit as recited in claim 17 wherein:

the outdoor air damper is movable into a plurality of positions between an extreme closed position and an extreme open position; and the sensor assembly selectively activates each fan in response to positions of the outdoor air damper.

20. The air handling unit as recited in claim 17 further comprising a fan located in the supply passage.

21. The air handling unit as recited in claim 17 further comprising at least one air conditioning element located in the supply passage, wherein the air conditioning element is selected from the group consisting of a filter, a cooling element, and a heating element.

* * * * *